United States Patent [19]

Mueller

[11] 4,100,225

[45] * Jul. 11, 1978

[54] STABLE POLYMER COMPOSITIONS CONTAINING PERFLUOROALKYL GROUPS AND PROCESS FOR MAKING

[75] Inventor: Karl Mueller, New York, N.Y.

[73] Assignee: Ciba-Geigy Corporation, Ardsley, N.Y.

[*] Notice: The portion of the term of this patent subsequent to Apr. 8, 1992, has been disclaimed.

[21] Appl. No.: 663,420

[22] Filed: Mar. 3, 1976

Related U.S. Application Data

[63] Continuation of Ser. No. 481,429, Jun. 20, 1974, abandoned, which is a continuation of Ser. No. 355,639, Apr. 30, 1973, abandoned, which is a continuation of Ser. No. 122,131, Mar. 8, 1971, abandoned, which is a continuation-in-part of Ser. No. 750,464, Aug. 6, 1968, abandoned.

[51] Int. Cl.$^2$ .................. C08F 255/06; C08F 279/02; C08F 261/06; C08F 265/06
[52] U.S. Cl. ........................... 260/878 R; 260/875; 260/876 R; 260/879; 260/880 R; 260/885
[58] Field of Search .................. 260/879, 878 R, 875, 260/885, 876, 880 R

[56] References Cited

U.S. PATENT DOCUMENTS

| | | | |
|---|---|---|---|
| 3,068,187 | 12/1962 | Bolstad et al. | 260/878 R X |
| 3,252,932 | 5/1966 | Bolstad et al. | 260/878 R X |
| 3,594,353 | 7/1971 | Domba | 260/78.4 E |
| 3,876,729 | 4/1975 | Mueller | 260/878 R |

*Primary Examiner*—William F. Hamrock
*Attorney, Agent, or Firm*—Edward McC. Roberts; Michael W. Glynn; Prabodh I. Almaula

[57] ABSTRACT

A polymer composition comprising a blend of: (a) a graft copolymer of a perfluorinated unsaturated compound, which only reluctantly homopolymerizes, on a backbone polymer, (b) a copolymer of said perfluorinated unsaturated compound with an ethylenically unsaturated comonomer, and (c) oligomers of said perfluorinated unsaturated compound. The polymer composition is made by dissolving a compound of the formula $(R_f-A)_n-PG$ wherein n is an integer of 2 or 3, $R_f$ is a perfluoroalkyl group of at least 3 carbon atoms, A is a linking group, and PG is a polymerizable group derived from fumaric and related acids, together with a backbone polymer, a comonomer which copolymerizes with the perfluorinated compound, and a free radical initiator in an organic solvent and polymerizing at 40° C to 120° C for .5 to 24 hours.

The resulting stable polymer compositions are useful in imparting soil repellent properties to various substrates, especially textiles.

In a preferred embodiment, bis(1,1,2,2-tetrahydroperfluoroalkyl) fumarate, ethylene-propylene-1,5-hexadiene terpolymer and 4-hydroxybutylvinylether are polymerized in tetrachloroethylene in the presence of benzoyl peroxide.

12 Claims, No Drawings

STABLE POLYMER COMPOSITIONS CONTAINING PERFLUOROALKYL GROUPS AND PROCESS FOR MAKING

CROSS REFERENCE TO RELATED APPLICATIONS

This is a continuation of application Ser. No. 481,429, filed June 20, 1974, abandoned, which is a continuation of application Ser. No. 355,639, filed Apr. 30, 1973, now abandoned, which is a continuation of application Ser. No. 122,131, filed Mar. 8, 1971, now abandoned, which is a continuation-in-part of application Ser. No. 750,464, filed Aug. 6, 1968, now abandoned.

BACKGROUND OF THE INVENTION

1. Field of the Invention

This invention relates to polymer compositions comprising fluorinated polymers useful as soil repellent finishes for substrates such as leather, textiles, paper, wood, masonry, metals, plastics, glass, painted surfaces, and the like.

2. Description of the Prior Art

Polymeric compositions of perfluorinated organic compounds have been used in the past to provide soil repellent finishes for a variety of substrates. Polymeric compositions of perfluorinated organic compounds have found wide use as oil and water repellent finishes especially for textile materials.

Such compositions have been applied to textiles and other substrates from aqueous and solvent solution systems. In many instances, the solvents required for satisfactory results were expensive fluorinated solvents such as trifluorotoluene, and 1,1,2-trifluoro-1,2,2,-trichloroethane.

While many known polymeric compositions of the prior art have been used to provide finishes exhibiting at least satisfactory oil and water repellent properties, the durability of finishes utilizing prior art perfluorinated polymer compositions has often been much less than satisfactory. Thus, while the fabric or other substrate, which has been treated with a prior art perfluorinated polymer composition, might initially have satisfactory or even excellent oil and water repellent properties, after a short period of utilization and/or subsequent to being treated by a cleaning process, the repellent finish has largely lost its effectiveness due to poor adherence to the substrate.

One approach to increasing the durability of previously known perfluorinated polymer compositions in textile finishes is disclosed in U.S. Pat. No. 3,068,187 wherein a segmented copolymer selected from block and graft copolymers comprising an A segment having four polymerized units containing a perfluorinated group and containing at least 30% by weight of fluorine, and a B group comprising five consecutive monomeric units of a polymerizable monomer different from the fluorine containing monomeric units and in which the B segments contains less than 10% of fluorine derived from the perfluorinated compound of the A group is employed.

The compositions utilized in U.S. Pat. No. 3,068,187 utilize perfluorinated monomer compounds which readily homopolymerize including a relatively large variety of compounds containing perfluorinated alkyl groups based upon acrylic or methacrylic acid.

SUMMARY OF THE INVENTION

The primary object of this invention is to provide improved soil-repellent finishes which are based upon new polymer compositions derived from a compound having a perfluorinated alkyl group therein and containing ethylenic unsaturation derived from a polybasic acid such as fumaric acid and related acids.

The polymer compositions of the present invention have outstanding oil and water repellency characteristics in surface finishes and very satisfactory durability, particularly in textile applications. The outstanding repellency characteristics obtained using the polymer compositions of the present invention are achieved with far less fluorine content on a weight basis compared to previously known repellent polymer compositions based upon perfluorinated organic compounds.

The polymer compositions of the invention have excellent film-forming properties which permit a high degree of extension and yield soft finishes. The latter is of special advantage in providing "good hand" in textile applications. As indicated, by their enhanced durability, the polymer compositions of the present invention have excellent wash-and-dry clean fastness.

The polymer compositions of the present invention are obtained by dissolving a pre-formed polymer capable of providing graftsites, such pre-formed polymer sometimes being referred to as a "backbone polymer", or "rubber", together with a fluorinated unsaturated compound of the formula:

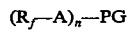
$$(R_f-A)_n-PG \qquad \qquad I$$

in an organic solvent system, with a free radical initiator, with or without a comonomer, and reacting the mixture in an inert atmosphere at from 40° C to about 120° C for about ½ to 24 hours. In the above Formula I, $R_f$ is a perfluorinated organic alkyl group, A is a linking group, $n$ is an integer of 2 to 3, and —PG is an ethylenically unsaturated group. The $(R_f-A)_n$—PG compound which contains the perfluorinated organic alkyl group is one which only very reluctantly homopolymerizes. The —PG group, which is an ethylenically unsaturated group, is derived from a polybasic acid selected from fumaric acid, maleic acid, mesaconic acid, citraconic acid, transaconitic acid and cis-aconitic acid, and methylene malonic acid.

The resulting composition is a very stable polymer composition capable of imparting excellent soil repellency to substrates especially textiles. The polymer composition of the present invention may be applied directly to such substrates as a solvent based finish, or it may be post-emulsified and subsequently applied as an emulsion finish system.

It is most significant that solvent applications of the compositions of the present invention do not require the use of expensive fluorinated solvents as has been the case with many prior art compositions.

The reaction according to the present invention can be carried out in one step alone, or a first step and then a second step, or by carrying out the first step and the second step simultaneously.

In the first step the specific fluorinated unsaturated compounds set forth below are reacted with the pre-formed polymers containing graftsites dissolved in organic solvents in the presence of a free radical initiator in an inert atmosphere at reaction temperatures until the reaction is complete.

The second step comprises the copolymerization with certain specific types of comonomers which form alternating copolymers with the $R_f$-compound utilized in the first step. The comonomers are reacted with the $R_f$-monomers which have not grafted to the sites of the dissolved polymer. It is understood that the second step may be carried out simultaneously with the first step, in which case, comonomers are present from the beginning of the reaction. The copolymerization is thus competing with the grafting reaction. The copolymerization, as indicated, can be delayed until after a certain amount of graft polymer has been formed by withholding the comonomer from the reaction mixture during the initial grafting period. Furthermore, the second step may be omitted, especially where a high percentage of the $R_f$-monomer has been grafted in the first step.

The polymer compositions according to the present invention thus comprises the specific $R_f$-compound graft polymers of the dissolved pre-polymer, small amounts of oligomers of the $R_f$-compound which, as indicated above, essentially does not homopolymerize, and where the second step is employed, there are present additionally, $R_f$-compound comonomers-copolymers as well as some homopolymer of the comonomer if the latter is present in excess, and can homopolymerize.

The polymer composition of the present invention is obtained either as a solution where all the polymers formed are soluble in the solvent employed, or as a dispersion if one of more of the polymers formed are insoluble in the solvent utilized. Most importantly, the solutions or dispersions obtained are very stable. It is believed that the graft polymer formed serves as a dispersant or emulsifier for the composition. Because the fluorinated compounds employed according to this invention does not readily homopolymerize, a large number of graftsites are formed and yield a graft polymer having many sites with short "fluorinated side chains" attached thereto, and they thus possess a high degree of homogeneity and repellency as opposed to the case of graft copolymers of fluoroalkyl methacrylate compounds which homopolymerize rapidly and thus produce graft copolymers with relatively few, but long "fluorinated side chains" and are thus more heterogeneous and less repellent.

Because of this, it is possible with the polymer compositions of the present invention to obtain very high repellencies with extremely small amounts of fluorine.

DESCRIPTION OF THE PREFERRED EMBODIMENTS

The polymerization according to this invention is carried out under an inert atmosphere such as nitrogen at temperatures of from about 40° C to about 120° C, depending on the particular initiator used. The preferred temperature range is from about 60° to about 90° C, with benzoyl peroxide as the initiator. Polymerization times of from about one-half hour to about 24 hours are employed. The reaction mixture should be shaken or stirred moderately during the polymerization process.

The polymerization reaction mixture in general may contain from about 2.5% to about 50% weight reactants, preferably 5% to 35%, and from about 50% to 97.5% solvent, preferably 65% to 95%, based upon total weight.

The composition of the reactants mixture may contain from 20 to 98.5% of the fluorinated unsaturated $(R_f—A)_n$—PG compound and comonomer, 1 to 79.5% of the dissolved backbone polymer, and from 0.5 to 10% by weight of the $(R_f—A)_n$—PG unsaturated compound of a free radical generating initiator.

In the polymer composition according to this invention, where only one polymerization step is employed, there may be present 100% of a graft copolymer of the dissolved backbone polymer and the $(R_f—A)_n$—PG compound, in which no more than three units of the $(R_f—a)_n$—PG compound are grafted to any one graftsite, or a mixture of the graft copolymer and oligomer of $(R_f—A)_n$—PG. Preferably, however, the composition of the present invention is one resulting from the two step polymerization process wherein in the first step the $(R_f—A)_n$—PG unsaturated compound is grafted to the dissolved pre-polymer and in the second step a comonomer which polymerizes with the $(R_f—A)_n$—PG unsaturated compound is included in the polymerization mixture. In the latter case which is preferred, the resulting polymer composition is a blend of the graft copolymer of the $(R_f—A)_n$—PG compound and the backbone polymer, the copolymer of $(R_f—A)_n$—PG and the comonomer added in the second step, very small amounts of oligomers of $(R_f—A)_n$—PG, and, if an excess of comonomer is present which comonomer homopolymerizes, homopolymers of such comonomer. It is preferred that the concentration of reactants and reactant times be adjusted so that the resulting polymer blend comprises by weight 30 to 80% of the copolymer of $(R_f—A)_n$—PG with the comonomer, and 20 to 70% by weight of the graft copolymer of $(R_f—A)_n$—PG on the backbone polymer in which 20 to 70% by weight of the graft copolymer is comprised of $(R_f—A)_n$—PG unsaturated compound.

Since the $(R_f—A)_n$—PG unsaturated compounds employed in this invention only reluctantly homopolymerize, it has been found that no more than three units of such compounds will graft to any one graftsite on the backbone polymer.

The percentage of backbone polymer in the total composition of reactants ranges from about carbon % to about 79.5%, preferably 15% to 55%, depending on the molecular weight and reactivity of the polymer.

Where the comonomer is one that can homopolymerize, molar ratios of up to 1.30 or higher of $R_f$-monomer to comonomer may be used, the homopolymer that is then formed serving in effect as an extender for the grafted alternating copolymer of $R_f$-monomer and the comonomer dispersion.

The backbone polymer or rubber as used in the specification can be any addition or condensation polymer which is soluble in a solvent in which the $R_f$-monomer and comonomer are soluble at the reaction temperature, and which has either at least one reactive double bond or a hydrogen atom, which can be abstracted by a free radical.

Unsaturated polymers are preferred as the rubber.

Representative examples of suitable rubbers or backbone polymers are: 1,4-polybutadiene, 1,2-polybutadiene, polyisoprene, styrene-butadiene copolymers and blockcopolymers, acrylonitrile butadiene copolymers, ethylene-propylene-diene terpolymers, chlorinated polyethylene, chlorinated polypropylene, polystyrene, polyvinyl toluene, poly-alphamethyl styrene, alkyl acrylates, alkyl-methacrylates, such as, polymethyl methacrylate and acrylate, polyethyl methacrylate and acrylate, polypropyl methacrylate and acrylate, polybutyl methacrylate and acrylate, polyisobutyl methacrylate and acrylate, poly-2-ethyl hexyl methacrylate and acrylate, polyoctyl methacrylate and acrylate, polyoctadecyl methacrylate and acrylate, polystearyl methacrylate and acrylate, polyallyl methacrylate and acrylate, polyhydroxybutylacrylate and methacrylate, poly-hydroxyethylacrylate and methacrylate, poly-N-methylaminoethylacrylate and methacrylate, poly-N-hydroxyethylaminoethylacrylate and methacrylate, poly-N,N-diethylaminoethyl methacrylate and acrylate, polyglycidyl methacrylate and acrylate, polyvinyl acetate, polyvinyl acetate-co-vinylpyrrolidone, polyvinyl propionate, polyvinyl butyrate, polyvinyl laurate, polyvinyl stearate, polyvinyl chloride, polyvinylidene chloride, polyvinylidene fluoride, polyvinyl methyl ketone, polyallyl acetate, poly-N-methylol acrylamide, poly-N-methylol methacrylamide, polyvinylpyridine, polyvinylpyrrolidone, polyvinyl acetate (partially hydrolized), polyvinyl butyral, polymethylvinylether, polyethylvinylether, polyisobutylvinylether, polydecylvinylether, polymethylvinylether-co-maleic anhydride, polymethylvinylether-co-dimethylfumarate, polymethylvinylether-co-dihydroxyethyl-fumarate, polystyrene-co-maleic anhydride, and the like.

Soluble condensation polymers useful as backbone polymers are typified by polyesters of dicarboxylic acids and dihydric alcohols, alkyd resins of dicarboxylic acids and polyols, polyamides of diamines and dicarboxylic acids, polyesteramides, copolyesters of diols and a plurality of diols, polyurethanes, polyureas, ethyl cellulose, cellulose esters, e.g., cellulose acetate, cellulose propionate, cellulose acetate butyrate, carboxymethyl cellulose, and polyalkylene ether glycols of molecular weights of 100 to 1500 and copolyether-glycols, for instance copolymers of propylene oxide and ethylene oxide.

It is to be understood that the term rubber or backbone polymer also embraces mixtures of such polymers.

If the recommended amounts of rubber content are exceeded, dispersions of too high viscosity result and there is a tendency for the rubber to crosslink during polymerization.

A larger amount of rubber should be used if the rubber has a low degree of unsaturation and vice versa. Linear rubbers of molecular weights of at least 3000 are preferred.

In the polymerization process of the present invention the rubber serves as a graft site or backbone for the $R_f$ group containing unsaturated compound. The graft polymer is believed to act as protective colloid for the ungrafted and/or excess $R_f$ compound, which would otherwise coagulate to a lump. In addition, the rubber serves as an economical extender and film-former itself helping to provide the excellent water repellency of the film finishes formed from the dispersions. If the rubber content of the dispersion is decreased to below recommended levels the dispersions become much less stable. A preferred backbone polymer is ethylenepropylenediene terpolymer rubber.

The concentration of initiator is usually between 0.5% and 10% by weight of the $R_f$-monomer used, preferably 1% to 5% and may be used up to a molar ratio of $R_f$-monomer to initiator of 1:0.5. These high concentrations of initiator can only be employed when the backbone polymers have little or no unsaturation.

Any of the common initiators used for free radical polymerization is non-aqueous media may be employed. Representative of such initiators are azoinitiators, e.g. 2,2'-azobisisobutyronitrile and 1,1'-azobiscyclohexane carbonitrile; aliphatic and aromatic acyl peroxides e.g. decanoyl peroxide, lauroyl peroxide, and benzoyl peroxide; ketone- and aldehyde peroxides, e.g. t-butyl peroxide, cumyl peroxide; hydroperoxides e.g. t-butyl hydroperoxide and cumene hydroperoxide; peresters and peroxacarbonates, e.g. t-butyl peracetate, t-butyl perpivalate, and t-butyl perbenzoate.

As indicated above, the solvent employed for the polymerization must be a solvent for the rubber and the monomers. Examples of generally suitable solvents are aliphatic and aromatic hydrocarbons such as hexane, heptane, ligroins, mineral spirits, benzene toluene, xylene and higher aromatic homologs, blends of high boiling hydrocarbons; chlorinated solvents e.g. chloroform, trichloroethylene and tetrachloroethylene; chlorinated aromatic solvents such as chlorobenzene; esters, ketones, and others such as ethyl acetate, 2-ethylhexyl acetate, acetone and higher homologs thereof, and tetrahydrofuran and other aliphatic or cycloaliphatic ethers, also alcohols, e.g. ethanol, 2-methoxyethanol, and 2-ethoxyethanol, fluorinated solvents e.g. trifluorotrichloroethane, trifluorotoluene, and hexafluoroxylene.

The dispersion polymer compositions of the present invention may be applied to substrates in a manner similar to solution polymers or may be post-emulsified and employed in a manner analogous to emulsion polymers.

The compositions of the present invention are particularly advantageous since they may be applied as solution polymers from nonfluorinated solvents. The avoidance of the necessity of having to employ the expensive fluorinated solvents is one of the primary advantages of the compositions of this invention over those of the prior art.

Where employed in a solution type application, volatile nonflammable solvents are preferred, such as tetrachloroethylene.

Where the polymer dispersion is post-emulsified, easily emulsifiable solvents such as mineral spirits and high boiling aromatic solvents with high flash points are preferred.

The specific types of unsaturated compounds containing fluorinated alkyl groups which may be utilized in the practice of this invention are as follows:

Compounds of the formula:

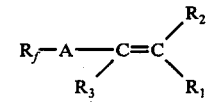

wherein $R_1$ and $R_2$ are (a) hydrogen, (b) methyl, or (c) $R_f$—A— and $R_3$ is (a) hydrogen; (c) $R_4$—A—; or (d) $R_f$—A—$CH_2$—; at least one of $R_1$, $R_2$, and $R_3$ being $R_f$—A— or $R_f$—A—$CH_2$—, at least one of $R_1$, $R_2$, and $R_3$ being hydrogen or methyl, wherein $R_f$ is a perfluorinated alkyl group, and A is a linking group. Thus, there are formed fumarates, maleates, methylene malonates, mesaconates, citraconates, itaconats, transaconitates, cis-aconitates.

In the foregoing formula $R_f$—A— may for example be

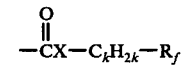

wherein $k$ is 0 to 10, and X is oxygen, or sulfur;

$$-\overset{O}{\underset{\|}{C}}O-(CH_2)_r CH=CH-R_f$$

wherein r is 1 to 10;

$$-\overset{O}{\underset{\|}{C}}O-CH_2CF_2CF_2-O-R_f, -\overset{O}{\underset{\|}{C}}O-(CH_2)_rX(CH_2)_rR_f$$

wherein r is 1 to 10, and X is oxygen or sulfur;

$$-\overset{O}{\underset{\|}{C}}-X-R'N(R'')-\overset{O}{\underset{\|}{C}}-R_f$$

wherein R' is alkylene of 2 to 6 carbons, R" is hydrogen or alkyl of 1 to 4 carbon atoms, and X is oxygen, or sulfur;

$$-\overset{O}{\underset{\|}{C}}-O-C_dH_{2d}-\underset{R}{N}-SO_2-R_f$$

wherein D is 2 to 11, R is alkyl of 1 to 4 carbons, and wherein $R_f$ in each case is $-C_mF_{2m+1}$ wherein m is 3 to 14; and the compound of the formulae:

[structure showing R_6, CH2=C-CH2-C with two N-C_qH_{2q}-R_f groups]

wherein, $R_6$ is hydrogen or methyl;
q is 1 or 2; and
$R_f$ is as defined above.

$R_f$ unsaturated compounds of the foregoing type especially useful in the practice of this invention are described in the following co-pending applications assigned to the assignee of the present invention:

Ser. No. 720,370, filed April 10, 1968, in the names of Eduard K. Kleiner and Martin Knell; Ser. No. 732,040, filed May 27, 1968, in the names of Eduard K. Kleiner, Martin Knell and Pier Luigi Pacini; Ser. No. 812,439, filed Apr. 1, 1969, in the name of Eduard K. Kleiner; Ser. No. 820,647, filed Apr. 30, 1969, in the name of Eduard K. Kleiner; and Ser. No. 833,706, filed June 16, 1969, in the names of Eduard K. Kleiner and Pier Luigi Pacini.

The $R_f-$ group of the $R_f$ compound should have at least three carbon atoms ie. $C_mF_{2m+1}$ wherein m is greater than 3. The value of the integer m ranges from 3 to 14, and preferably is about 6 to 12, with an average length of 8 carbons preferred in most instances.

It is to be understood that the perfluoroalkyl group may be a mixture of varying chain length. Basic starting materials are often obtained by telomerization procedures yielding $C_mF_{2m+1}$ groups of varying length.

A generally preferred type of fluorinated unsaturated compounds utilized in the practice of this invention is that in which $$R_f-A-\text{ is }-\overset{O}{\underset{\|}{C}}X-C_kH_{2k}-R_f \text{ or}$$

$$-\overset{O}{\underset{\|}{C}}O-C_dH_{2d}-\underset{R}{N}-SO_2-R_f$$

wherein X, k, d, R and $R_f$ are as defined above. The former type is especially preferred. Most preferred are bis(1,1,2,2-tetrahydroperfluoroalkyl)fumarates.

As indicated in the preferred embodiments of the invention, a comonomer with which the $(R_f-A)_n$—PG unsaturated compound will polymerize is added in a second step of the polymerization reaction.

While the comonomer may be added at the beginning of the reaction, it is preferred that the initial reaction with the $(R_f-A)_n$—PG compound extend for at least one-half hour prior to introduction of the comonomer.

In general, it is recommended that the duration of the first step polymerization be from about 1 to about 5 hours, and the polymerization of the second step likewise be of a duration of from about 1 to about 5 hours.

Typical of such comonomers are vinyl ethers, alpha-olefins, vinyl esters, styrenes and related monomers.

Examples of suitable vinyl ether comonomers are alkyl vinylethers, such as methyl vinyl ether, isopropyl vinyl ether, isobutyl vinyl ether, 2-methoxy ethylvinyl ether, n-propyl vinyl ether, t-butyl vinyl ether, isoamyl vinyl ether, n-hexyl vinyl ether, 1-methylheptyl vinyl ether, n-decyl vinyl ether, n-tetradecyl vinyl ether, n-octadecyl vinyl ether, 2-hydroxyethylvinyleter and 4-hydroxybutylvinylether.

Vinyl ether comonomers with short side chains are preferred.

Of all these vinyl ethers, the most preferred ones are: methyl vinyl ether, ethyl vinyl ether n-propyl vinyl ether, isopropyl vinyl ether, 2-methoxyethyl vinyl ether, 2-chloroethyl vinyl ether, 2-hydroxyethylvinylether and 4-hydroxybutylvinylether.

Propylene, butylene and isobutylene are preferred alpha-olefins useful as comonomers with the fluoro monomers. Straight and branched chain alpha-olefins are useful with up to 18 carbon atoms in the side chain.

Useful copolymers of the novel perfluorinated compounds of the invention are formed with vinyl esters, e.g. vinyl acetate, vinyl esters of substituted acids such as for example, vinyl methoxyacetate, vinyl trimethylacetate, vinyl isobutyrate, isopropenyl butyrate, vinyl lactate, vinyl caprylate, vinyl pelargonate, vinyl myristate, vinyl oleate and vinyl linoleate; vinyl esters of aromatic acids, such as vinyl benzoate.

Preferred of the foregoing vinyl esters are vinyl acetate, vinyl propionate, vinyl benzoate, and isopropenyl acetate.

Also useful as comonomers are styrene and related monomers which copolymerize readily with the perfluorinated monomers, such as O-methylstyrene, p-methylstyrene, 3,4-dimethyl styrene, 2,4,6,-trimethyl styrene, m-ethyl styrene, 2,5-diethyl styrene.

Additional useful comonomers are ethylene and chloro-, fluoro- and cyano- derivatives of ethylene such as vinyl-chloride, vinylidenechloride, vinylfluoride, vinylidene fluoride, acrylonitrile, methacrylonitrile, tetrafluoroethylene, trifluorochloroethylene, hexafluoropropylene; acrylate and methacrylate monomers, particularly those with 1 to 18 carbon atoms in the ester groups such as n-propyl methacrylate, 2-methyl cyclohexyl methacrylate, methyl methacrylate t-butyl methacrylate, n-butyl methacrylate, methyl acrylate, ethyl acrylate, propyl acrylate, butyl acrylate, 3-methyl-1-pentylacrylate, octylacrylate, tetradecylacrylate, s-butylacrylate, 2-ethylhexyl acrylate, 2-methoxyethyl acrylate, and phenyl acrylate; dienes particularly 1,3-butadiene, isoprene, and chloroprene, 2-fluoro-butadiene, 1,1,3-trifluoro-3,4-dichlorobutadiene and tri- and pentafluoro butadiene and isoprene; nitrogen-vinyl monomers such as vinyl pyridine, N-vinylimides, amides, and secondary cyclic amines, like vinyl succinimide, vinyl pyrrolidone, N-vinyl carbazole and the like.

Also useful as comonomers with some of the perfluorinated monomers are vinyl monomers which contain perfluorinated side chains. Examples of such perfluorinated monomers are vinyl ethers of the type disclosed in U.S. Pat. No. 2,732,370 and U.S. Pat. No. 2,828,025; vinyl esters containing fluorinated alkyl groups disclosed in U.S. Pat. No. 2,592,069 and U.S. Pat No. 2,436,144. Other useful monomers are acrylates and methacrylates and derivatives thereof such as those disclosed in U.S. Pat. No. 2,628,958; U.S. Pat. No. 3,256,230; U.S. Pat. No. 2,839,513; U.S. Pat. No. 3,282,905; U.S. Pat No. 3,252,932 and U.S. Pat. No. 3,304,278.

In most instances, following the polymerization process of the present invention, quantitative yields of the dispersion polymers are obtained. The viscosities of the products can vary over a wide range and are typically from ~200 cps. to 4000 cps. if the product is considered too viscous for practical use, its viscosity can be reduced by addition of small amounts of nonsolvents for the backbone polymer.

In most instances, following the polymerization process of the present invention, quantitative yields of the dispersion polymers are obtained with no separation of layers which thus facilitates the extending of the composition prior to application as a soil repellent substrate finish.

The polymer compositions made under these conditions are generally in the form of a white opaque dispersion; however, at higher levels of backbone polymer, they become increasingly translucent and can be clear solutions.

Concentrations of the polymer dispersions according to the present invention in solvent which provide coatings with effective oil and water repellency properties will generally be of the order of 0.01 to 10% and preferably from 0.1 to 2.0% by weight.

The polymer compositions obtained according to the present invention can readily be extended by blending with commonly employed non-fluorinated solution or dispersion polymers. In addition, the dilution of the composition prior to application to a substrate can be accomplished with many common inexpensive solvents provided that they are miscible with the solvent employed during the polymerization step. The polymer composition of the present invention can then be applied to substrates after extension or dilution according to commonly known methods applicable to solvent application systems like padding or spraying or dipping. Where employed in a solution type application, volatile non-flammable solvents are preferred, such as tetrachloroethylene or 1,1,1-trichloroethane. They are also very useful in airless spray applications because they are easily diluted with halogenated organic solvents.

The dispersion polymers of the present invention may also be post-emulsified in water with ordinary emulsifiers which are known emulsifiers for the particular solvent used in the polymerization step. Easily emulsifiable solvents such as mineral spirits and high boiling aromatic solvents with high flash points are preferred; also useful are polar solvents such as methyl-isobutylketone or 2-ethoxyethanolacetate.

When water miscible solvents and hydrophilic backbones are employed, the dispersions can be directly diluted with water, without using additional emulsifiers.

Blends of the polymer compositions of this invention with other polymers and copolymers are particularly useful in textile finishes. The polymers and copolymers are generally of a non-fluorinated type; however, as indicated below other fluorinated polymers and copolymers may be used if desired. Non-fluorinated polymers useful in such blends, include for example, but without limitation, polymers and copolymers of alkyl acrylates and alkyl methacrylates, such as methyl methacrylate, ethyl methacrylate, isobutyl methacrylate, hexyl methacrylate, and n-octyl methyacrylate. Particularly suitable polymers are poly(methyl methacrylate), poly(isobutyl methacrylate) and poly(n-octyl methacrylate). Also useful are polymers and copolymers of acrylic acid, methacrylic acid, styrene, alkyl styrene, butadiene, 2-methyl-1,3-butadiene, 2-chloro-1,3-butadiene; polymers and copolymers of vinyl esters such as vinyl acetate, vinyl butyrate, vinyl laurate, vinyl stearate, vinyl 2-ethylhexanoate; polymers and copolymers of vinyl halides and vinylidene halides, such as vinyl chloride, vinylidene chloride, vinyl fluoride, vinylidene fluoride; polymers and copolymers of allyl esters such as allyl propionate, or allyl caprylate; polymers and copolymers of vinyl ketones, such as vinyl methyl ketone, vinyl ethyl ketone, and the like; polymers and copolymers of vinyl ethers such as methyl vinyl ether, polymers and copolymers of vinyl ethers such as methyl vinyl ether, cetyl vinyl ether, and the like; polymers and copolymers of acrylamide, methacrylamide, N-methylol acrylamide, N-methylol methacrylamide, N-isopropyl acrylamide, and acrylonitrile and methacrylonitrile.

For example, from about 20 to 97% by weight of poly(methyl methacrylate) blended with the polymer composition of this invention provides very useful coating compositions which retain surprisingly high repellency ratings even though the relative amount of fluorinated polymer is very low.

A preferred class of extender polymers for the dispersion polymers of the present invention, particularly for textile applications, is disclosed in U.S. Pat. No. 3,349,054. These extender polymers give soft finishes that are light stable and help to impart excellent wash-and-dry clean fastness to finishes comprised of polymer dispersion of this invention.

Of course, it is understood that besides application to textiles, the coatings of the fluorinated polymer compositions of the present invention are useful in providing oil and water repellent coatings for leather, paper, wood, masonry, metals, plastics, glass, painted surfaces, and the like. A very significant advantage of the polymer compositions of the present invention is that they form effective oil repellent coatings with relatively very low fluorine levels on the substrate. In other words, on a given weight basis, the fluorine content of the polymer compositions of this invention exhibits more effective repellent properties than the same level of fluorine in other polymer compositions previously utilized in the art.

In addition, because of the excellent film-forming properties of these fluorinated polymer compositions, they can be used as unsupported films and as membranes. A further advantage of the polymer compositions of this invention is that they require no separate curing or heating step, but provide excellent repellent properties after drying in air.

The polymer compositions of this invention described in the following Examples were evaluated as textile finishes. In the evaluations carried out in Examples 1 – 44, the polymer compositions were extended with poly(methyl methacrylate) to a fluorine content based on the total polymer composition of 20% by weight. The polymer composition was then diluted with 1,1,1-trichloroethane and applied by a padding process usually to a cotton print fabric (80 × 80) at varying concentrations to provide the added fluorine on the fabric in the amounts indicated in the Examples. The fabric was then dried for three minutes at 100° C and tested for oil and water repellency.

In Examples 45 – 78, the textile material was dipped in a bath comprising the polymer composition to be evaluated, and the amount of the retained solution adjusted so as to leave approximately 2% of solids by weight of the fabric on the fabric. The fabric was dried at room temperature and then in an oven at a temperature of 175° C for about two minutes.

Very good repellency ratings were obtained even at low levels of application. Thus, with the polymer compositions of the present invention it is possible to obtain very satisfactory performance at decreased cost because of the lesser amounts of expensive fluorine required to obtain equivalent results compared to previous compositions.

In the Examples below, the repellency ratings were determined as follows:

The AATCC water spray test rating was determined according to Standard Test method 22-1966 of the American Association of Textile Chemists and Colorists, XXXVII, 1961, p. 1952 (also designated ASTM-D-583-58).

Oil repellency is measured by the 3-M-Oil test procedure of Grajek and Peterson, Textile Research Journal, April 1962, p. 323 or by AATCC Standard Test method 18-1966.

The cotton/polyester fabric referred to in the evaluations is a 65% polyester-35% cotton blend. The polyester is one formed from ethylene glycol and terephthalic acid, sold for example under the Dacron trademark.

The following examples describing certain representative embodiments of this invention will serve to further illustrate the nature of this invention. It is to be understood that the examples are merely illustrative, and intended to enable those skilled in the art to practice the invention in all of the embodiments flowing therefrom and do not in any way limit the scope of the invention defined in the claims. Unless otherwise specified, the relationship of parts by weight to parts by volume is that of grams to cubic centimeters, and temperatures are degrees Centigrade.

The $R_f$ fumarate referred to in the following Examples is a mixture of Bis(1,1,2,2-tetrahydroperfluoroalkyl) fumarates which may be prepared by the telomerization of perfluoroalkyliodide with ethylene and the reaction of the telomer with fumaric acid in the presence of triethylamine to yield the desired diester described in copending application Ser. No. 829,764, filed June 2, 1969 in the names of Martin Knell and Edward Berger and assigned to the same assignee as the present application, or by other methods such as converting the telomer iodide to the corresponding alcohol and esterifying directly with fumaryl chloride are known to those skilled in the art.

The mixed bis(1,1,2,2-tetrahydroperfluoroalkyl) fumarate employed in Examples 1 to 44 is an off-white wax in appearance having a melting range of 60°– 68° C. The composition of the $R_f$ group of diesters analyzed by VPC is as follows:

| | | |
|---|---|---|
| —$C_{12}F_{25}$ | ($C_6/C_6$ - diester) | 3.5% |
| —$C_{14}F_{29}$ | ($C_6/C_8$ - diester) | 21.7% |
| —$C_{16}F_{33}$ | ($C_6C_{10} + C_8C_8$ - diester) | 38.8% |
| —$C_{18}F_{37}$ | ($C_8C_{10}$ - diester) | 27.6% |
| —$C_{20}F_{41}$ | ($C_{10}C_{10}$ - diester) | 8.0% |
| | | 99.6% | and the fluorine content is 63.5%.

In Examples 45 – 78, the $R_f$ group of the diesters had approximately the following range:

| | |
|---|---|
| $C_6F_{13}$ | 17.4% |
| $C_8F_{17}$ | 71.5% |
| $C_{10}F_{21}$ | 9.9% |
| $C_{12}F_{25}$ | 0.7% |

EXAMPLE 1

7.5 g Of the above $R_f$-fumarate monomer mixture (Mol. Wt. 1000) are placed in a 200 ml glass ampoule. The monomer mixture is melted and then cooled under nitrogen. 0.3 g Benzoyl-peroxide (BPO) are added, followed by 2 g ethylene-propylene hexadiene terpolymer(EPT) rubber (40 g of a 5% solution in tetrachloroethylene) and a total of 85 g tetrachloroethylene. 0.52 g Methylvinylether are pipetted into the ampoule which is sealed under nitrogen. The ampoule is shaken in a waterbath at 80° C for 10 hours. The product is a white, viscous cream.

A 5 g sample of the dispersion is poured into 50 cc hexafluoroxylene. The precipitated rubbery gel is isolated and washed in hexafluoroxylene dissolved in petroleum ether, dried to a thin film, washed with methanol, and finally dried in vacuo at 50° C for 5 hours and analyzed for fluorine.

The sample is diluted with 1,1,1-trichloroethane and applied to samples of cotton print 80/80 fabric by padding at 0.04, 0.08 and 0.12% fluorine on the fabric; the treated fabric is dried at 100° C for 3 minutes and tested for oil and water repellency according to the AATCC testing procedure described above. The results are indicated in Table I below.

EXAMPLE 2

The procedure of Example 1 is repeated, but 8 g 1,1-dihydropentadecafluorooctyl methacrylate are employed instead of the $R_f$-fumarate/methylvinylether comonomers combination. The product is a tightly crosslinked gel.

EXAMPLE 3

The Example 2 is repeated, but the BPO concentration employed is 0.1 g. The product is a viscous, white dispersion. Results of the repellency tests re indicated in Table I.

EXAMPLE 4

2.5 g of the above $R_f$-fumarate monomer mixture, 0.3 g BPO, 2.5 g ethylene-propylene-hexadiene terpolymer rubber and a total of 95 g tetrachloroethylene are filled into a 200 cc ampoule and sealed under nitrogen. After shaking 10 hours at 80° C in a waterbath the product obtained is a viscous, slightly translucent liquid. The results of the repellency tests are indicated in Table I.

TABLE I

| Ex. | BPO, moles per moles of monomer | % F in grafted rubber | Repellency: AATCC - OIL 0.04 | 0.08 | 0.12 | Water 0.08 % F |
|---|---|---|---|---|---|---|
| 1 | 0.165 | 15 | 2 | 4 | 5 | 70 |
| 2 | 0.07 | (gel) | not measured | | | |
| 3 | 0.025 | 22.6 | 1 | 2 | 3 | 50 |
| 4 | 0.5 | 26.8 | 5 | 6 | 7 | 70 |

The results shown in Table I indicate that high amounts of peroxide can be used to prepare $R_f$-fumarate grafts on the rubber backbone yielding excellent repellency even at low levels of fluorine on the fabric. With the $R_f$-methacrylate a similar product cannot be made, since crosslinking occurs at high levels of peroxide, whereas at low peroxide concentrations, homopolymerization primarily occurs.

The $R_f$-methacyrlate grafted rubber of Example 3 has a white haze and shows stress whitening typical of heterogeneous polymers, whereas the $R_f$-fumarate grafted rubber of Example 4 is clear and shows no stress whitening, despite its higher fluorine content. This indicates that the $R_f$-methacrylate is grafted as a polymer on few sites, while the $R_f$-fumarate is grafted as a monomer on many sites. The latter, "homogeneous" graft is outstandingly better in performance.

EXAMPLE 5

22 g Ethylene-propylene-1,5-hexadiene terpolymer rubber are dissolved in 990 g tetrachloroethylene by heating it to 80° C in a 1 liter 3-neck flask equipped with stirrer, thermometer, nitrogen sponge and reflux condenser. 78.5 g of the above $R_f$-fumarate mixture is then added, followed by 2.2 g benzoyl-peroxide. The mixture is stirred under nitrogen at 80° C for 105 minutes, after which time 9.7 g of 4-hydroxybutylvinylether and 1.1 g benzoyl-peroxide are added. After 2 more hours of stirring at 80° C, the contents are cooled. The product is a white, viscous dispersion.

A sample of the dispersion is diluted with a mixture of 50 parts 1,1,1-trichloroethane, 40 parts of 1,1,2-trifluoro-2-chloroethylene and 10 parts acetone to 0.1% solids; this solution is filled in a spraycan and sprayed onto a suede leather swatch. The oil repellency is 8 and water repellency 100, after drying in air.

Another part of the dispersion is diluted with 1,1,1-trichloroethane and enough polymethylmethacrylate to give a fluorine content of 20% in the solids, and applied as a spray to the various textile substrates listed below in Table II.

TABLE II

| Fabric | Content | Backing | Weight | Oil and Water Repellency Initial - % F 0.01 | 0.02 | 0.04 | After abrasion* 0.01 | 0.02 | 0.04 |
|---|---|---|---|---|---|---|---|---|---|
| poplin | 100% cotton | no | 6.5 oz | 2 | 3 | 6 | 0 | 2 | |
| | | | | 0 | 0 | 70 | | | |
| pointed twill | 23% cotton 67% nylon | yes | 13.3 oz | 2 | 6 | 7 | 0 | 1 | 2 |
| | | | | 0 | 0 | 60 | | | |
| floral jaquard | 57% rayon 41% cotton | no | 12.8 oz | 2 | 5 | 6 | 1 | 2 | 2 |
| | | | | 0 | 0 | 70 | | | |
| plush | 37% cotton | no | 15.5 oz | 4 | 7 | 8 | 1 | 3 | 4 |
| | | | | 50 | 60 | 70 | | | |
| open weave | 27% cotton 49% rayon 24% acetate | yes | 14.5 oz | 2 | 4 | 5 | 1 | 2 | 3 |
| | | | | 50 | 50 | 50 | | | |

* The 3-M abrasion test was employed. An AATCC Crockmeter, Model CM-1 was employed with Wetordry-TRI-I-MITE abrasive paper no. 320 and specimens 2×5 inches for 10 cycles.

EXAMPLE 6

Example 5 is repeated but duration of the initial grafting step is 60 minutes rather than 105.

EXAMPLE 7

Example 5 is repeated but duration of the initial grafting step is 30 minutes rather than 105.

The following Table illustrates the influence that withholding the comonomer for varying periods will exert on the characteristics of the end product. Grafting of $R_f$-fumarate to the rubber can be increased and tailored to a desired level.

TABLE III

Influence of Duration of Step I on Grafting and Performance

| Ex. | Time of initial grafting step | % F in EPT rubber after first step | Final | Repellency AATCC - OIL 0.04 | 0.08 | 0.12 | Water 0.08 % F |
|---|---|---|---|---|---|---|---|
| 5 | 105 min. | 15.4 | 26.0 | 6 | 6 | 7 | 70+ |
| 6 | 60 " | 10.4 | 21.1 | 4 | 6 | 7 | 70 |
| 7 | 30 " | 6.2 | 19.2 | 3 | 5 | 6 | 70 |
| 1 | 0 " | — | 15 | 2 | 4 | 5 | 70 |

EXAMPLE 8

The procedure of Example 5 is repeated but the temperature employed is 70° C.

EXAMPLE 9

The procedure of Example 5 is repeated but the temperature employed is 90° C.

EXAMPLE 10

The procedure of Example 5 is repeated but at 70° C and with half the charge of benzoyl-peroxide.

The following Table IV indicates the comparative repellency values obtained employing the products of Examples 8, 9, 10 and 5 at the indicated amounts of polymer on the cotton fabric. It can be seen that raising the temperature increases grafting, and results in a corresponding increase in performance. Lower temperature and initiator concentration reduces grafting, favoring copolymerization, and reducing performance.

TABLE IV

| | | | | Repellency | | |
|---|---|---|---|---|---|---|
| | | % F in EPT | | AATCC-OIL | | Water |
| Ex. | Temp. | after Step 1 | Final | 0.04 | 0.08 | 0.08 % F |
| 5 | 80° C | 15.4 | 26 | 6 | 6 | 70 |
| 8 | 70° C | 13.0 | 16.0 | 4 | 6 | 50 |
| 9 | 90° C | 22.7 | 25.8 | 6 | 6 | 80 |
| 10 | 70° C | 6.1 | 8.9 | 2 | 6 | 70 |

EXAMPLE 11

An $R_f$-fumarate polymer dispersion is prepared according to the procedure of Example 5, but the initial reaction time is adjusted to give a product with approximately the same amount of fluorine in the ethylene-propylene-terpolymer, as that obtained in Example 3 with 1,1-dihydropentadecafluorooctylmethacrylate. Both samples are fractionated and analyzed for fluorine and tested for repellency according to the procedure above. The results are shown in Table V.

TABLE V

Performance of Polymer Fractions

| | | | | | Repellency | |
|---|---|---|---|---|---|---|
| | $R_f$-monomer | | | | AATCC-Oil | Water |
| Ex. | system | Fractions | % | % Fluorine | 0.04　0.08 (%F) | 0.08 |
| 11 | Fumarate | *HFX Sol | 67 | 56 | 2　　5 | 0 |
| | | HFX Gel | 33 | 24 | 5　　6 | 70 |
| | | Combined | 100 | 47 | 5　　6 | 70 |
| 3 | Methacrylate | HFX Sol | 77 | 60 | 1　　2 | 0 |
| | | HFX Gel | 23 | 23 | 1　　2 | 0 |
| | | Combined | 100 | 51 | 1　　2 | 0 |

*Hexafluoroxylene

At a comparable fluorine content the $R_f$-fumarate graft (=HFX Gel) performs much better than the $R_f$-methacrylate graft. This is also true, but to a lesser extent, for the hexafluoroxylene soluble fraction.

EXAMPLE 12

10.5 g Of the above $R_f$-fumarate mixture, 28 g of a 10% ethylene-propylene-hexadiene terpolymer rubber solution in mineral spirit (Amsco 66/3), 0.42 g benzoyl peroxide, 0.72 g methylvinylether and 30 g mineral spirit (Amsco 66/3) are placed in a 200 ml. ampoule and sealed under nitrogen. The ampoule is shaken at 80° C for eight hours. The product resulting is a white, viscous dispersion. A sample of this dispersion is diluted with 1,1,1-trichloroethane and applied to white cotton fabric by a padding procedure to give 0.04 to 0.08% fluorine by weight on the fabric, which is then tested for oil and water repellency, the results being shown in Table VI.

EXAMPLE 13

The procedure of Example 12 is repeated, but 1,1-dihydropentadecafluorooctylmethacrylate is employed instead of the $R_f$-fumarate vinylether combination of the present invention. The resulting dispersion is tested for oil and water repellency, the results being shown in Table VI.

TABLE VI

| | | Repellency | | |
|---|---|---|---|---|
| | | AATCC-Oil | | AATCC-Water |
| Ex. | $R_f$-monomer system | 0.04 | 0.08 | 0.08 % Fluorine |
| 12 | Fumarate-vinylether | 1 | 3 | 70 |
| 13 | Methacrylate | 0 | 0 | 0 |

EXAMPLE 14

8 g Of the above $R_f$-fumarate mixture, 2 g cis-1,4-polybutadiene, 1 g 2-methoxy-ethylvinylether, 90 g mineral spirits and 0.08 g benzoyl peroxide are sealed in an ampoule under nitrogen. The ampoule is shaken in a water bath for 15 hours at 80° C. The resulting product is a white, stable dispersion, which is then diluted with tetrachloroethylene and pad applied to white cotton fabric. The results of repellency testing are shown in Table VII.

EXAMPLE 15

The procedure of Example 14 is repeated, but with tetrachloroethylene as solvent, and 0.25 g polybutadiene. The product is a white, stable dispersion. Repellency data is shown in Table VII.

EXAMPLE 16

The procedure of Example 14 is repeated, but with polyisoprene instead of polybutadiene as the backbone rubber. The product is a white, stable dispersion. Repellency data is shown in Table VII.

EXAMPLE 17

The procedure of Example 14 is repeated, using a styrene-butadiene polymer rubber (styrene content: 20%) instead of polybutadiene. The product is a white, stable dispersion. Repellency data are shown in Table VII.

EXAMPLE 18

The procedure of Example 14 is repeated, but instead of the polybutadiene, a mixture of 1 g polyisoprene and 0.55 g polybutadiene is used as a backbone rubber. The product is a white, stable dispersion. Repellency test results are shown in Table VII.

TABLE VII

| Ex. | Solvent | Backbone polymer, rubber % | Repellency Oil 0.04 | 0.08 | 0.12 | Water 0.04 | 0.08 % F |
|---|---|---|---|---|---|---|---|
| 14 | mineral spirits | polybutadiene 20% | 2 | 4 | 6 | 60 | 70 |
| 15 | $C_2Cl_4$ | polybutadiene 20% | 3 | 5 | 6–7 | 50 | 70 |
| 16 | mineral spirits | polyisoprene 20% | 2 | 3–4 | 5 | 60 | 70 |
| 17 | mineral spirits | styrene-butadiene copol. 20% | 2 | 2–3 | 5 | 60 | 70 |
| 18 | mineral spirits | polyisoprene and polybutadiene 10% & 5.5%, respectively | 2 | 4 | 5 | 60 | 70 |

EXAMPLE 19

5 g Of the above $R_f$-fumarate mixture, a solution of 5 g polyisobutylmethacrylate in 15 g methylisobutylketone and 0.125 g benzoyl peroxide are sealed in an ampoule under nitrogen and shaken in a water bath at 80° C for 16 hours. The product is a thick, opaque dispersion; a sample of it is diluted with 1,1,1-trichloroethane and applied to cotton print (80 × 80) fabric, to give 0.04 to 0.12% fluorine by weight on the fabric and tested for oil and water repellency with the results shown in Table VIII.

EXAMPLE 20

2.5 g Of the above $R_f$-fumarate mixture, a solution of 2.5 g polymethylmethacrylate in 22 g acetone, 0.3 g 4-hydroxybutylvinylether and 0.08 g benzoyl peroxide are sealed in an ampoule under nitrogen. The ampoule is shaken in a water bath at 80° C for 10 hours. The product is a translucent dispersion. A sample is diluted with 1,1,1-trichloroethane and applied to cotton print (80 × 80) fabric, to give 0.04 to 0.08% fluorine by weight of the fabric, and tested for oil and water repellency with the results shown in Table VIII.

EXAMPLE 21

The procedure of Example 20 is repeated with polyisobutylmethacrylate as the backbone polymer and methyl-isobutylketone as solvent. The final product is a viscous, white dispersion, which is tested for repellency with the results shown in Table VIII.

EXAMPLE 22

5 g. Of the above $R_f$-fumarate mixture, a solution of 5 g. polymethylvinylether in 50 g. 2-ethoxy-ethanol and 0.25 g. benzoyl peroxide are sealed in an ampoule under nitrogen and shaken at 80° C for 10 hours. The product is a white, viscous dispersion, which is tested for oil and water repellency with the results shown in Table VIII.

EXAMPLE 23

5 g. Of the above $R_f$-fumarate mixture, a solution of 0.5 g. acrylonitrile-butadiene copolymer in 20 g. methylisobutylketone, 0.7 g. 4-hydroxybutylvinylether and 0.1 g. benzoyl peroxide are sealed in an ampoule under nitrogen and shaken at 80° C for 10 hours. The product is a light brown, opaque dispersion, which is tested for oil and water repellency with the results shown in Table VIII.

EXAMPLE 24

2.5 g. Of the above $R_f$-fumarate monomer mixture, a solution of 2.5 g. polyisobutylmethacrylate in 15 g. methylisobutylketone, 0.3 g. 4-hydroxy-butylvinylether and 0.08 g. benzoyl peroxide are sealed in an ampoule under nitrogen. The ampoule is shaken at 80° C for ten hours. The product is an opaque, viscous dispersion, which is diluted with 1,1,1-trichloroethane and applied to cotton print (80/80) to give 0.04 to 0.12% fluorine by weight on the fabric and tested for oil and water repellency with the results shown in Table VIII.

EXAMPLE 25

2.5 g Of the above $R_f$-fumarate monomer mixture, a solution of 2.5 g methylmethacrylate in 22 g acetone, 0.3 g 4-hydroxybutyl vinylether and 0.08 g benzoyl peroxide are sealed in an ampoule under nitrogen. The ampoule is shaken at 80° C for 10 hours. The product is a translucent dispersion, which is diluted with 1,1,1-trichloroethane and applied and tested for repellency with the results shown in Table VIII.

EXAMPLE 26

5 g Of the above $R_f$-fumarate mixture, a solution of 5 g polyvinylpyrrolidone in 50 g 2-ethoxy-ethanol and 0.25 g benzoyl peroxide are sealed in an ampoule under nitrogen. The ampoule is shaken for 10 hours at 80° C. The product is a light yellow opaque dispersion, a sample of which is diluted with 1,1,1-trichloroethane and applied and tested for repellency with the results shown in Table VIII. Another sample is diluted to 10% solids with a mixture of 10 parts acetone and 90 parts 2-ethoxy-ethanol, and further diluted with water and applied by a padding process to cotton print (80 × 80), so as to give 0.04, 0.08, and 0.12% fluorine of the fabric and tested for oil and water repellency with the results as shown in Table IX.

EXAMPLE 27

20 g Of the above $R_f$-fumarate monomer mixture, a solution of 5.6 g polyvinylpyrrolidone in 112 g of 2-ethoxy-ethanol, 2.6 g 4-hydroxybutylvinylether and 0.42 g benzoyl peroxide are sealed in a 200 cc ampoule under nitrogen. The ampoule is shaken at 80° C for ten hours. The product is a light yellow, viscous, opaque dispersion. A sample of it is diluted with 1,1,1-trichloroethane and applied and tested for repellency with the results shown in Table IX. Another sample is diluted with an acetone/2-ethoxyethanol mixture and applied out of water with the results shown in Table IX.

EXAMPLE 28

5 g Of the above $R_f$-fumarate monomer mixture, 3 g of a polyester prepared by condensation of 1 mol maleic anhydride and 1 mol phthalic anhydride with 2 moles propylene glycol, 27 g 2-ethoxyethanol, 0.7 g of 4-hydroxybutylvinylether and 0.1 g benzoyl peroxide are sealed in an ampoule under nitrogen. The ampoule is shaken for ten hours at 80° C. The product is a white dispersion, which separates slowly into two layers, which are easily redispersed. It is diluted with 1,1,1-trichloroethane and applied and tested for repellency with the results shown in Table VIII.

EXAMPLE 29

8 g Of the above $R_f$-fumarate monomer mixture, a solution of 8 g butadiene-acrylonitrile copolymer in 90 g tetrahydrofuran, 1 g of 2-methoxy-ethylvinylether and 0.08 g benzoyl peroxide are sealed in a 200 cc. ampoule under nitrogen. The ampoule is shaken at 80° C for 8 hours. The product is a light brown, opaque, viscous dispersion, which is diluted with 1,1,1-trichloroethane and tested for repellency with the results in Table VIII.

EXAMPLE 30

8 g. Of the above $R_f$-fumarate monomer mixture, a solution of 8 g. maleic-anhydride methylvinylether copolymer in 90 g. acetone, 1 g. 2-methoxy-ethylvinylether and 0.08 g. benzoyl peroxide are sealed in a 200 cc. ampoule under nitrogen and shaken at 80° C for eight hours. The product is a viscous, white dispersion, which is diluted with acetone and applied and tested for repellency with the results shown in Table VIII.

EXAMPLE 31

The procedure of Example 30 is repeated, but with polymethylvinylether as the backbone polymer. The product is a white dispersion, which is diluted with acetone and applied and tested for repellency with the results shown in Table VIII.

EXAMPLE 32

EXAMPLE 33

4.5 g Of the above $R_f$-fumarate monomer mixture, 0.5 g of a polyester prepared by condensation of 1 mol maleic anhydride with 1 mol polyethylene-ether-glycol (MW-300), 0.5 g 4-hydroxybutylvinylether, 0.08 g benzoyl peroxide and 20 g acetone are sealed in a 50 cc ampoule under nitrogen and shaken at 80° C for ten hours. The product is a slightly cloudy dispersion, a sample of which is diluted with 1,1,1-trichloroethane and applied and tested with the results shown in Table VIII. Another sample is diluted by pouring it into excess water and applied by an aqueous padding process to cotton print (80 × 80) so as to give 0.04 to 0.12% fluorine on the fabric which is cured for three minutes at 150° C and tested for oil and water repellency (See Table IX).

EXAMPLE 34

12 g Of the above $R_f$-fumarate monomer mixture, 3 g of 1,2-polybutadiene with terminal hydroxy groups and a molecular weight of ~ 3000, 35 g methyl-ethylketone, and 0.25 g benzoyl peroxide are sealed in an ampoule under nitrogen and shaken for ten hours at 80° C. The product is clear, slightly yellow solution, which is diluted with 1,1,1-trichloroethane and applied and tested for repellency with the results shown in Table VIII.

EXAMPLE 35

The procedure of Example 34 is repeated but employing unmodified 1,2-polybutadiene in methylisobutylketone. The product is a clear, yellow solution, which is tested for repellency with the results shown in Table VIII.

TABLE VIII

| | | | Solvent Application | | AATCC-OIL | | | AATCC-Water | |
| Ex. | Backbone Polymer | % of Polymer | Comonomer | Reaction Medium | 0.04 | 0.08 | 0.12 | 0.04 | 0.08 % F |
| --- | --- | --- | --- | --- | --- | --- | --- | --- | --- |
| 19 | Polyisobutylmethacrylate | 50% | — | MIBK[4] | 2 | 4 | 5–6 | 50 | 50 |
| 20 | Polymethylmethacrylate | 50% | — | Acetone | 2 | 4 | 5 | 50 | 50 |
| 21 | Polyisobutylmethacrylate | 50% | HBVE[3] | MIBK | 2 | 4 | 5 | 50 | 50 |
| 22 | Polymethylvinylether | 50% | — | 2-EE[5] | 3 | 4 | 5 | 50 | 50 |
| 23 | Butadiene-co-acrylonitrile | 9% | HBVE | MIBK | 3 | 4 | 5 | 50 | 60 |
| 24 | Polyisobutylmethacrylate | 20% | HBVE | MIBK | 2 | 4 | 3 | 50 | 60 |
| 25 | Polymethylmethacrylate | 50% | HBVE | Acetone | 4 | 5 | 5 | 0 | 60 |
| 26 | Polyvinylpyrrolidone | 50% | — | 2-EE | 2 | 4 | 5 | 0 | 0 |
| 27 | Polyvinylpyrrolidone | 20% | HBVE | 2-EE | 2 | 4 | 5 | 0 | 0 |
| 28 | Unsaturated polyester[1] | 35% | HBVE | 2-EE | 2 | 4 | 4 | 50 | 50 |
| 29 | Butadiene-co-acrylonitrile | 50% | 2-Methoxy-ethylvinyl-ether | Tetrahydrofuran | 2 | 4 | 5 | 50 | 60 |
| 30 | Maleic anhydride-co-methyl-vinylether | 50% | 2-methoxy-ethyl-vinyl-ether | Acetone | 3 | 4 | 5 | 50 | 50 |
| 31 | Polymethylvinylether | 50% | " | Acetone | 3 | 4 | 5 | 50 | 60 |
| 32 | Polyallylmethacrylate | 20% | vinylacetate | Benzene | 1 | 3 | 4 | 50 | 50 |
| 33 | Unsaturated polyester[2] | 10% | HBVE | Acetone | 3 | 5 | 6 | 0 | 0 |
| 34 | 1.2-Polybutadiene OH terminated | 20% | — | MEK | 2 | 5 | 5 | 70 | 70 |
| 35 | 1.2-Polybutadiene | 20% | — | MIBK | 2 | 5 | 5 | 60 | 70 |

[1] From maleic anhydride, phthalic anhydride, and propylene glycol in the ratio 1:1:2.
[2] Poly(polyethyleneetherglycol)maleate.
[3] 4-Hydroxybutylvinylether
[4] Methyl-isobutylketone
[5] 2-Ethoxyethanol 8 g. Of the above $R_f$-fumarate monomer mixture, a solution of 2 g. polyallylmethacrylate in 50 g. benzene, 1 g. vinylacetate and 0.08 g. benzoyl peroxide are sealed in an ampoule under nitrogen and shaken at 80° C for 8 hours. The product is a white, opaque dispersion which is diluted with 1,1,1-trichloroethane and applied and tested for repellency with the results shown in Table VIII.

TABLE IX

| | | Aqueous Application | | | | |
| | | Repellency | | | | |
| | | AATCC - Oil | | | AATCC-Water | |
| Ex. | Backbone Polymer | 0.04 | 0.08 | 0.12 | 0.04 | 0.08 % F |
| --- | --- | --- | --- | --- | --- | --- |
| 26 | Polyvinyl-pyrrolidone 50% | — | 4 | — | | 50 |
| 27 | Polyvinyl-pyrrolidone 20% | 1 | 4 | 5 | 0 | 0 |

TABLE IX-continued

| | | Aqueous Application Repellency | | | | |
|---|---|---|---|---|---|---|
| | | AATCC - Oil | | | AATCC-Water | |
| Ex. | Backbone Polymer | 0.04 | 0.08 | 0.12 | 0.04 | 0.08 % F |
| 33 | Polyester of polyethyleneether glycol 1) and maleic-anhydride 10% | 0 | 2 | 4 | 60 | 50 |

1) Mol. W. - 300

EXAMPLE 36

The procedure of Example 34 is repeated with carboxy terminated 1,2-polybutadiene of molecular weight 2000 and with methylisobutyl ketone as solvent. The product is a clear, yellow solution which is evaluated for repellency with the results shown in Table X.

EXAMPLE 37

5 g Of 1,1-dihydro-pentadecafluorooctylmethacrylate, 1.25 g carboxy terminated 1,2-polybutadiene of a molecular weight of ~ 2000, 14.6 g methyl-isobutylketone and 0.1 g benzoyl peroxide are sealed in an ampoule under nitrogen and shaken for 10 hours at 80° C. The product is a very viscous, white opaque dispersion, a sample of which is diluted with 1,1,1-trichloroethane and tested for repellency with the results indicated in Table X.

0.1 g benzoyl peroxide are sealed in an ampoule under nitrogen and shaken for 10 hours at 80° C. The product is a white, opaque dispersion, which is diluted, and tested for repellency with the results shown in Table XI.

EXAMPLE 40

19 g Of the above $R_f$-fumarate monomer mixture, a solution of 14 g of polyvinylbutyral in 140 g 2-ethoxyethanol, 2.4 g 4-hydroxybutylvinylether and 0.42 g benzoyl peroxide are sealed in an ampoule under nitrogen and shaken for 10 hours at 80° C. The product is a white, opaque dispersion, which is evaluated for oil and water repellency with the results shown in Table XI.

EXAMPLE 41

5 g Of pentadecafluorooctylmethacrylate, 5 g of a solution of 5 g polyvinylbutyral in 50 g 2-ethoxyethanol and .1 g benzoyl peroxide are sealed in an ampoule under nitrogen and shaken for 10 hours at 80° C. The product is a white, opaque dispersion, a sample of which is diluted with 1,1,1-trichloroethane and evaluated for repellency with the results shown in Table XI.

EXAMPLE 42

5 g Of pentadecafluorooctylmethacrylate, a solution of 1.25 g polyvinylbutyral in 25 g 2-ethoxyethanol and 0.10 g benzoyl peroxide are sealed in an ampoule under

TABLE X

| | | | | Appearance | Repellency AATCC OIL | | | AATCC H$_2$O | |
|---|---|---|---|---|---|---|---|---|---|
| | | | | | 0.04 | 0.08 | 0.12 | | |
| Ex. | Backbone | $R_f$-Monomer | Solvent | Of Product* | % Fluorine on Fiber | | | 0.04 | 0.08 |
| 36 | 1.2-polybutadiene 20% | $R_f$-fumarate | MIBK | Clear solution | 2 | 5 | 5 | 60 | 70 |
| 37 | 1.2-polybutadiene 20% | $R_f$-methacrylate | MIBK | Opaque, viscous | 0 | 1 | 1 | 0 | 50 |

*The appearance of the two products of Examples 36 and 37 indicates that due to lack of homopolymerization, a more homogeneous graft is formed with the fumarate, whereas the methacrylate forms primarily homopolymer.

EXAMPLE 38

5 g Of the above $R_f$-fumarate monomer mixture, a solution of 5 g polyvinylbutyral in 50 g of 2-ethoxyethanol and 0.1 g benzoyl peroxide are sealed in an ampoule under nitrogen and shaken for 10 hours at 80° C. The product is a white, opaque dispersion, a sample of which is diluted with 1,1,1-trichloroethane and tested for repellency with the results indicated in Table XI.

EXAMPLE 39

5 g Of the above $R_f$-fumarate monomer mixture, a solution of 1.4 g of polyvinylbutyral in 45 g of 2-ethoxyethanol-acetate, 0.55 g 4-hydroxybutylvinylether and nitrogen and shaken for 10 hours at 80° C. The product is a white, opaque dispersion, which is diluted and tested for repellency with the results indicated in Table XI.

TABLE XI

| | | | | Repellency | | | |
|---|---|---|---|---|---|---|---|
| | | $R_f$-Monomer | | AATCC-OIL | | | AATCC-H$_2$O |
| Ex. | Backbone | System | Solvent | 0.04 | 0.08 | 0.12 % F | 0.08 % F |
| 38 | Polyvinylbutyral 50% | $R_f$-fumarate | 2-ethoxy ethanol | 1 | 4 | 5 | 0 |
| 39 | 22% " | $R_f$-fumarate /4-hydroxybu-tylvinylether | 2-ethoxy ethanol-acetate | 2 | 4 | 5 | 50 |
| 40 | 40% " | $R_f$-fumarate /4-hydroxybu-tylvinylether | 2-ethoxy ethanol | 1 | 4 | 5 | 0 |
| 41 | 50% " | $R_f$-methacrylate | 2-ethoxy ethanol | 0 | 2 | 4 | 0 |
| 42 | 20% " | $R_f$-methacrylate | 2-ethoxy ethanol | 0 | 0 | 0 | 0 |

EXAMPLE 43

8 g. Of Di-(1,1,2,2-tetrahydropentadecafluorononyl) fumarate, a solution of 2.2 g. ethylene-propylene-hexadiene terpolymer rubber in 57 g. tetrachloroethylene and 0.22 g. benzoyl peroxide are sealed into an ampoule and reacted for 100 minutes at 80° C; then the ampoule is cooled to room temperature and opened; 1 g. 4-hydroxybutylvinylether and 0.11 g. benzoylperoxide are added and the ampoule sealed again under nitrogen and shaken for 2 more hours at 80° C. The product is a white viscous dispersion.

EXAMPLE 44

Example 43 is repeated employing appropriate amounts of the following perfluoroalkyl group containing monomers in place of the above $R_f$-fumarate.

a. bis(hexafluoroisopropyl) fumarate, m.p. 53°–5° C
b. bis(1,1,2,2-tetrahydroperfluorononylthiolo) fumarate
c. bis(1,1-dihydroperfluorooctyl) itaconate, b.p. 128°–131° C at 0.1 mm
d. bis[2-(n-perfluorooctano-amido)ethyl]fumarate, m.p. 151°–152.5° C
e. bis[2-n(perfluorooctanoamido)ethyl]thiofumarate, m.p. 195°–197° C
f. bis[2-(N-ethyl-n-perfluorooctane sulfonamido)-ethyl] itaconate, m.p. 99.5°–100.5° C
g. N-1,1-dihydroperfluorooctyl maleimide, m.p. 70°–70.5° C
h. N-1,1-dihydroperfluorooctyl citraconimide, m.p. 78°–79° C
i. bis(N-1,1-dihydroperfluorooctyl) itaconamide
j. bis[2-(N-ethyl-n-perfluorooctane sulfonamido)ethyl] fumarate, m.p. 112°–112.5° C In all cases, white viscous dispersions were formed having good repellent properties. For example, the composition employing bis[2-(N-ethyl-n-perfluorooctane sulfonamido) ethyl] fumarate, when applied to fabric at the levels indicated below, exhibited the repellency values shown.

| Repellency | | | | | |
|---|---|---|---|---|---|
| AATCC - Oil | | | AATCC - Water | | |
| 0.04 | 0.08 | 0.12 % F | 0.04 | 0.08 | 0.12 % F |
| 4 | 5-6 | 6 | 50 | 90 | 100 |

EXAMPLES 45–47

92 Parts of a solution containing 2 parts of cis-1,4-polybutadiene, 90 parts of mineral spirits, 8 parts of a mixture containing the $R_f$-fumarate and the comonomers as listed in Table XII in the molar ratio of 1 to 1.2, 0.04 parts of benzoyl peroxide and 0.04 parts of lauroyl peroxide are sealed in an ampoule under nitrogen. The polymerization is carried out by shaking the ampoule in a water bath for 15 hours at 75° C and for 3 hours at 85° C. The product obtained in all three cases is a white, slightly viscous, stable dispersion, which after evaporation of the solvent forms a soft, non-tacky film. The conversion of the monomers to polymers is 100 percent as indicated by IR analysis. The polymer dispersions are diluted with tetrachloroethylene to a solid content of 2% and applied to fabrics to provide a coating of 2% by weight of the fabric. The repellency ratings are determined as described supra and are indicated in Table XII.

TABLE XII

| | | Repellency (2% Polym. on Fabric) | | |
|---|---|---|---|---|
| Ex. | Comonomer | F | 3-M-Oil Test | AATCCH$_2$O Test |
| 45 | 2-methoxyethyl-vinylether | C 1) | 140 | 90 |
| | | W 2) | 140 | — |
| | | C/D 3) | 140 | 100 |
| 46 | Vinylacetate | C | 120 | 90 |
| | | W | 110 | — |
| | | C/D | 120 | 90 |
| 47 | Styrene | C | 120 | 70 |
| | | W | 110 | — |
| | | C/D | 120 | 70 |

1) C = Cotton
2) W = Wool
3) D = Dacron

EXAMPLE 48

Example 48 is carried out as Example 45 but employing tetrachloroethylene as the solvent instead of mineral spirits.

The resulting stable creamy white dispersion was evaluated with the following ratings obtained.

| Repellency | | (2% Polym.) (on Fabric) |
|---|---|---|
| Fabric | 3-M Oil Test | AATCC H$_2$O Test |
| C | 140 | 90 |
| W | 140 | — |
| C/D | 140 | 100 |

EXAMPLES 49 – 53

The parts and types of rubber as listed in Table XIII in 45 parts "Solvesso"—a high boiling aromatic hydrocarbon solvent blend—9 parts of a mixture containing the $R_f$-fumarate and 2-methoxyethylvinyl ether in a molar ratio of 1 to 1.2, 0.04 parts each of lauroyl- and benzoyl-peroxide are sealed in an ampoule under nitrogen and polymerized as described in Examples 45 – 47. Conversions obtained are shown in Table XIII. The stable dispersions are diluted to a 2% solid content using tetrachloroethylene as diluent and applied to fabrics. The repellency ratings obtained are shown in Table XIII.

TABLE XIII

| | | | | | | Repellency (2% Polym.) (on Fabric) | |
|---|---|---|---|---|---|---|---|
| Ex. | Type and parts of rubber | Comonomer | Conversion % MF | Description of Dispersion | Properties of Polymer film | Fabric | 3-M Oil Test | AATCC H$_2$O Test |
| 49 | 2 parts of cis-1,4-polybutadiene (DIENE 35) | 2-methoxy-ethyl vinyl ether | 100 | stable, white creamy | soft, not tacky | C | 140 | 90 |
| | | | | | | W | 140 | — |
| | | | | | | C/D | 140 | 90 |
| 50 | 2 parts of cis-1,4-polyisoprene (Natsyn) | 2-methoxy-ethyl vinyl ether | 100 | stable, white creamy | soft, not tacky | C | 130 | 80 |
| | | | | | | W | 130 | — |
| | | | | | | C/D | 130 | 80 |
| 51 | 8 parts of polyallyl-methacrylate MW: 25,000 | Vinyl-acetate | ~50 | unreacted $R_f$-monomer sedimentates | tacky | C | | |
| | | | | | | W | | |
| | | | | | | C/D | | |
| 52 | 2 parts of butadiene-acrylonitrile copolym. (Hycar) | 2-methoxy-ethyl vinyl ether | ~50 | unreacted $R_f$-monomer sedimentates | rubbery | C | | |
| | | | | | | W | | |
| 53 | 8 parts ethylene-propylene-diene- | 2-methoxy-ethyl vinyl | 100 | stable, white creamy | soft, tacky | C | 130 | 80 |
| | | | | | | W | 140 | — |

TABLE XIII-continued

| Ex. | Type and parts of rubber | Comonomer | Conversion % MF | Description of Dispersion | Properties of Polymer film | Repellency (2% Polym.) (on Fabric) | | |
|---|---|---|---|---|---|---|---|---|
| | | | | | | Fabric | 3-M Oil Test | AATCC H$_2$O Test |
| | terpolymer (Nordel) | ether | | | | C/D | 140 | 80 |

EXAMPLES 54 – 56

The procedure of Examples 45 – 47 is repeated, but employing bis (1,1-dihydroperfluorononyl) fumarate, bis (1,1,2,2-tetrahydroperfluorononyl) fumarate, and bis (1,1-dihydroperfluorooctyl) itaconate respectively as the R$_f$-monomer in Examples 54 – 56. In each instance the comonomer is 2-methoxyethylvinyl ether. The resulting polymer compositions are diluted as in Examples 1 – 3 and applied to fabric. Excellent oil and water repellent ratings are obtained.

EXAMPLES 57 – 60

A 2% by weight dispersion of the polymer described in Example 45 is blended in different ratios with a 2% by weight solution of poly(n-octyl methacrylate). These blends are applied to fabrics and the repellency evaluated as supra. Results are shown in Table XIV.

TABLE XIV
REPELLENCY OF POLYMER BLENDS

| | Blend of (% by weight) | | | Repellency (2% Polym. on Fabric) | |
|---|---|---|---|---|---|
| Ex. | R$_f$-Polymer | Poly(n-octyl methacrylate) | Fabric | 3-M Oil Test | AATCC H$_2$O Test |
| 57 | 40 | 60 | C | 130 | 80 |
| | | | W | 130 | — |
| 58 | 20 | 80 | C/D | 130 | 80 |
| | | | C | 120 | 80 |
| | | | W | 130 | — |
| 59 | 10 | 90 | C/D | 130 | 80 |
| | | | C | 80 | 80 |
| | | | W | 110 | — |
| 60 | 5 | 95 | C/D | 90 | 80 |
| | | | C | 50 | 80 |
| | | | W | 0 | — |
| | | | C/D | 0 | 80 |

EXAMPLES 61 – 75

Following the procedure of Examples 45 – 47, employing equivalent amounts of the comonomers and the amounts and types of rubbers indicated in Table XV, the dispersion polymerization compositions thus obtained were diluted to 2% solids by weight and applied as above to fabrics, and the repellency rating determined with the results as shown in Table XV. In each instance the R$_f$-monomer employed was bis (1,1,2,2-tetrahydroperfluoroalkyl) fumarate wherein the average chain length of the R$_f$ group was 8 carbons.

TABLE XV

| Ex. | Comonomer | Type and Amount* of Rubber | Polymerization Solvent | Repellency (2% Polym.) (on Fabric) | | |
|---|---|---|---|---|---|---|
| | | | | Fabric | 3-M Oil Test | AATCC H$_2$O Test |
| 61 | 2-methoxyethylvinyl ether | 26% polybutadiene | Mineral spirits | C | 140 | 100 |
| | | | | W | 140 | — |
| | | | | C/D | 140 | 90 |
| 62 | 2-methoxyethylvinyl ether | 47% ethylene-propylene butadiene terpolymer | Mineral spirits | C | 140 | 80 |
| | | | | W | 140 | — |
| | | | | C/D | 140 | 90 |
| 63 | 2-methoxyethylvinyl ether | 37% ethylene-propylene butadiene terpolymer 3% poly-butadiene | Mineral spirits | C | 140 | 90 |
| | | | | W | 140 | — |
| | | | | C/D | 140 | 90 |
| 64 | Styrene | 20% polybutadiene | Mineral spirits | C | 120 | 20 |
| | | | | W | 130 | — |
| | | | | C/D | 130 | 70 |
| 65 | Vinyl acetate | 20% polybutadiene | Mineral spirits | C | 130 | 90 |
| | | | | W | 130 | — |
| | | | | C/D | 140 | 90 |
| 66 | 2-methoxyethylvinyl ether | 25% polybutadiene | Mineral spirits | C | 140 | 100 |
| | | | | W | 140 | — |
| | | | | C/D | 140 | 100 |
| 67 | 2-methoxyethylvinyl ether | 20% polybutadiene | Mineral spirits | C | 140 | 100 |
| | | | | W | 140 | — |
| | | | | C/D | 140 | 100 |
| 68 | 2-methoxyethylvinyl ether | 5.4% polybutadiene 9.4% polyisoprene | Mineral spirits | C | 130 | 100 |
| | | | | W | 130 | — |
| | | | | C/D | 130 | 100 |
| 69 | 2-methoxyethylvinyl ether | 13% polybutadiene | Mineral spirits | C | 140 | 90 |
| | | | | W | 140 | — |
| | | | | C/D | 140 | 100 |
| 70 | 2-methoxyethylvinyl ether | 20% polybutadiene | Blend of high boiling aromatic hydrocarbon solvents (Solvesso) | C | 140 | 80 |
| | | | | W | 140 | — |
| | | | | C/D | 140 | 90 |
| 71 | Styrene | 13% polybutadiene | Mineral | C | 120 | 80 |

TABLE XV-continued

| Ex. | Comonomer | Type and Amount* of Rubber | Polymerization Solvent | Repellency (2% Polym.) (on Fabric) | | |
|---|---|---|---|---|---|---|
| | | | | Fabric | 3-M Oil Test | AATCC H$_2$O Test |
| | | diene | spirits | W | 140 | — |
| | | | | C/D | 130 | 90 |
| 72 | 2-methoxy-ethylvinyl ether | 15% polybutadiene | Mineral spirits | C | 120 | 80 |
| | | | | W | 140 | — |
| | | | | C/D | 120 | 80 |
| 73 | 2-methoxy-ethylvinyl ether | 5% polybutadiene | Mineral spirits | C | 120 | 80 |
| | | | | W | 140 | — |
| | | | | C/D 130 | 80 | |
| 74 | 2-methoxy-ethylvinyl ether | 5% polybutadiene | Heptane | C | 120 | 80 |
| | | | | W | 130 | — |
| | | | | C/D | 130 | 80 |
| 75 | Styrene | 6.5% polybutadiene | Heptane | C | 110 | 80 |
| | | | | W | 120 | — |
| | | | | C/D | 120 | 80 |

*Based upon weight of final polymer product.

EXAMPLES 76 - 78

8 Parts of poly(methylvinylether) are dissolved in 90 parts acetone and the solution placed in an ampoule. 8 Parts of the R$_f$-monomer employed in Examples 61 – 75, 0.04 parts benzoylperoxide, 0.04 parts lauroyl-peroxide, and 1 part 2-methoxyethylvinylether are added. The polymerization is carried out at 75° C for 15 hours and then at 85° C for 3 hours. The resulting product is a white, stable polymer dispersion which is diluted to 2% solids content with acetone, applied to fabric as hereinabove. Excellent repellency values are obtained.

The foregoing is repeated, but in place of the poly(-methylvinylether) and the acetone, the rubbers and solvents indicated in the following Table XVI are employed. The resulting polymer dispersions are diluted to 2% solids content with additional quantities of the polymerization solvent, applied to fabrics as above, and the repellency ratings determined with the results shown in Table XVI.

TABLE XVI

| Ex. | Rubber | Solvent | Repellency (2% Polym.) (on Fabric) | | |
|---|---|---|---|---|---|
| | | | Fabric | 3-M Oil Test | AATCC H$_2$O Test |
| 77 | Butadiene acrylonitrile copolymer | Tetrahydrofuran | C | 130 | 70 |
| | | | W | 140 | — |
| | | | C/D | 140 | 70 |
| 78 | Methylvinylether maleic anhydride copolymer | Acetone | C | 140 | — |
| | | | W | 140 | — |
| | | | C/D | 140 | 70 |

I claim:

1. A process for preparing a composition comprising a backbone polymer having attached to the graft sites thereof perfluoroalkyl ester units with no more than three units attached to any one graft site, which comprises dissolving a backbone polymer having a reactive double bond or a hydrogen atom which can be abstracted by a free radical, a free-radical generating initiator, and a perfluoroalkyl ester of fumaric acid in an organic solvent and reacting the resulting mixture for a period of time in the range of about 0.5 to about 24 hours.

2. The process of claim 45, wherein the perfluoroalkyl alcohol portions of the perfluoroalkyl ester are selected from the group consisting of $$R_f - C_kH_{2k} - O - \qquad (i)$$

$$R_f - CH=CH - (CH_2)_r - O - \qquad (ii)$$

$$R_f - O - CF_2CF_2 - CH_2 - O - \qquad (iii)$$

$$R_f - (CH_2)_r X (CH_2)_r - O - \qquad (iv)$$

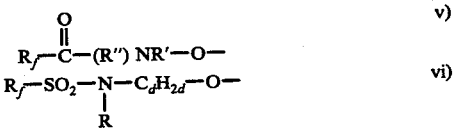
(v)

(vi)

where
R$_f$ is perfluoroalkyl of 3 to 18 carbon atoms,
k is an integer from 0 to 10,
r is an integer from 1 to 10,
R' is an alkylene of 2 to 6 carbon atoms,
R'' is hydrogen or alkyl of 1 to 4 carbon atoms,
d is an integer from 2 to 11,
R is alkyl of 1 to 4 carbon atoms,
X is — O — or — S —.

3. The process of claim 1, wherein the reactants are present to the extent of about 2.5 to about 50% by weight of the reaction mixture.

4. The process of claim 1, wherein the organic solvent is tetrafluoroethylene.

5. The process of claim 2, wherein the backbone polymer is ethylene-propylene-1,5-hexadiene terpolymer rubber, the selected perfluoroalkyl alcohol portions R$_f$—C$_k$H$_{2k}$—O — where R$_f$ is a mixed perfluoroalkyl moiety of 6-10 carbon atoms and k is 2.

6. A composition comprising a graft polymer obtained by grafting no more than three perfluoroalkyl ester units to one graft site of an organic solvent-soluble backbone polymer having a reactive double bond or a hydrogen atom which can be abstracted by a free radical, wherein the perfluoroalkyl ester units are a perfluoroalkyl ester of an acid selected from the group consisting of fumaric, maleic, mesaconic, citraconic, transaconitic, cis-aconitic, and methylene malonic acids.

7. The composition of claim 6, wherein the perfluoroalkyl alcohol portions perfluoroalkyl ester are selected from the group consisting of $$R_r - C_kH_{2k} - O - \qquad (i)$$

$$R_f - CH=CH - (CH_2)_r - O - \qquad (ii)$$

polyisoprene, R$_f$ —O polyisobutylmethacrylate,
$$CF_2CF_2 - CH_2 - O - \qquad (iii)$$

$$R_f - (CH_2)_r X (CH_2)_r - O - \qquad (iv)$$

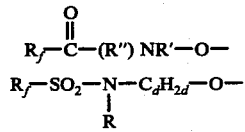   v)

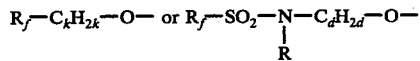   vi)

where
- $R_f$ is perfluoroalkyl of 3 to 18 carbon atoms,
- $k$ is an integer from 0 to 10,
- $r$ is an integer from 1 to 10,
- $R'$ is an alkylene of 2 to 6 carbon atoms,
- $R''$ is hydrogen or alkyl of 1 to 4 carbon atoms,
- $d$ is an integer from 2 to 11,
- $R$ is alkyl of 1 to 4 carbon atoms,
- $X$ is $-O-$ or $-S-$.

8. The composition of claim 7, wherein the selected perfluoroalkyl alcohol portions are $$R_f-C_kH_{2k}-O- \text{ or } R_f-SO_2-\underset{R}{N}-C_dH_{2d}-O-$$

where $R_f$ is perfluoroalkyl of 6 to 12 carbons atoms, and the backbone polymer is an unsaturated hydrocarbon polymer.

9. The composition of claim 8, wherein the selected perfluoroalkyl alcohol portions are $$R_f-C_kH_{2k}-O-$$

where $R_f$ is perfluoroalkyl of 6 to 12 carbon atoms, and $k$ is an integer from 0 to 10.

10. The composition of claim 6, wherein the backbone polymer is selected from ethylene-propylene terpolymers, polybutadiene, polyisopropene, poly(styrene-butadiene), poly(acrylonitrilebutadiene), polyvinylpyrrolidone, polymethylvinylether, polyallymethacrylate, olyisobutylmethacrylate, polymethylmethacrylate, poly(maleic anhydride-methylvinylether), polyvinylbutyral, and mixtures thereof.

11. The composition of claim 6, wherein the backbone polymer is ethylene-propylene-1,5-hexadiaeneterpolymer rubber, the selected acid is fumaric acid, the selected perfluoroalkyl alcohol portions are $R_f-C_kH_{2k}-O-$ where $R_f$ is a mixed perfluoroalkyl moiety of 6-10 carbon atoms and $k$ is 2.

12. The process of claim 1, wherein the backbone polymer is selected from ethylene-propylene terpolymers, polybutadiene, polyisoprene, poly(styrene-butadiene), poly(acrylonitrile-butadiene), polyvinylpyrrolidone, polymethylvinylether, polyallymethacrylate, polyisobutylmethacrylate, polymethacrylate, poly(maleic anhydride-methylvinylether), polyvinylbutyral, and mixtures thereof.

* * * * *